United States Patent [19]

Nuimura

[11] Patent Number: 5,233,424
[45] Date of Patent: Aug. 3, 1993

[54] AMPLIFIER CIRCUIT TO PREVENT VIDEO "BUZZING" SOUND CAUSED BY A TURNING ROUND OF VIDEO SIGNAL INTO POWER SOURCE

[75] Inventor: Yoshimi Nuimura, Saitama, Japan

[73] Assignee: Kabushiki Kaisha Toshiba, Kawasaki, Japan

[21] Appl. No.: 940,293

[22] Filed: Sep. 3, 1992

[30] Foreign Application Priority Data

Sep. 11, 1991 [JP] Japan .................. 3-231548

[51] Int. Cl.$^5$ .................. H04N 5/44; H04N 5/63; H04N 5/50; H04N 5/14
[52] U.S. Cl. .................. 358/188; 358/190; 358/191.1; 358/166
[58] Field of Search .................. 358/188, 190, 191.1, 358/160, 166; 455/298, 299; 363/39; 307/491, 542, 555, 558

[56] References Cited

U.S. PATENT DOCUMENTS 4,742,393  3/1988  Sugai et al. .................. 358/188

Primary Examiner—John K. Peng
Assistant Examiner—John W. Miller
Attorney, Agent, or Firm—Cushman, Darby & Cushman

[57] ABSTRACT

In a television receiving apparatus, the output step of a video IF circuit or a video amplifying circuit in the rear step is formed by using an NPN transistor amplifying circuit and PNP transistor amplifying circuit and both transistor amplifying circuits are fed with as an input a video signal of the same polarity and are fed with as a power source a voltage from the same power source circuit as of the tuner and video IF circuit.

5 Claims, 8 Drawing Sheets

AMPLIFIER CIRCUIT TO PREVENT VIDEO "BUZZING" SOUND CAUSED BY A TURNING ROUND OF VIDEO SIGNAL INTO POWER SOURCE

BACKGROUND OF THE INVENTION

1. Field of the Invention

This invention relates to television receiving apparatus and more particularly to a television receiving apparatus wherein a video buzzing sound is prevented from being produced by a video signal turning round into a power source system.

2. Description of the Related Art

As sound receiving systems of television receiving apparatus, there are a split carrier (or separate carrier) detecting system and intercarrier detecting system.

The intercarrier detecting system is a system wherein a sound intermediate frequency (for example, of 54.25 MHz) and a video intermediate frequency (for example, of 58.75 MHz) converted by a tuner are amplified by the same intermediate frequency amplifying circuit and are detected and a beat component (4.5 MHz) of the video intermediate frequency (58.75 MHz) and sound intermediate frequency (54.25 MHz) included together with a video signal in the output of the detecting circuit is utilized as a sound intercarrier signal.

FIG. 6 shows an essential part of a television receiving apparatus of a conventional intercarrier detecting system.

In FIG. 6, an RF television signal input into an antenna 1 is input into an electronic tuning tuner (mentioned as an ET tuner hereinafter) 2 in which a desired channel signal is selected from among the RF signals. An intermediate frequency signal (mentioned as an IF signal hereinafter) from the ET tuner 2 is amplified and video-detected by a video intermediate frequency circuit (mentioned as a video IF circuit hereinafter) 4. The video-detected video signal is fed to a sound intermediate frequency circuit (mentioned as a sound IF circuit hereinafter) 7 and video amplifying circuit 8. The video signal is amplified by the video amplifying circuit 8 and is output. At the same time, a sound intercarrier signal included in the video signal is amplified and sound FM-detected by the sound IF circuit 7. In the here shown apparatus, the power source for the local oscillating circuit of the ET tuner 2, the power source of the video IF circuit 4 and the power source of the video amplifying circuit 8 are obtained from the same power source circuit 9.

Now, in case the power source for the local oscillating circuit of the ET tuner 2, the power source of the video IF circuit 4 and the power source of the video amplifying circuit 8 are driven by the same power source circuit 9 as mentioned above, with the variation of the video signal current, a slight ripple voltage will be produced in the power source line, the local oscillation output of the ET tuner 2 will fluctuate because of this ripple voltage, the sound IF signal in the output of the ET tuner 2 will be also influenced by the video signal, as a result, the sound intercarrier signal obtained from the video IF circuit 4 will be influenced and, when this is sound-detected, a video buzzing sound will be generated in the television sound to disadvantage.

On the other hand, the split carrier detecting system wherein a sound intermediate frequency (for example, 54.25 MHz) and a video intermediate frequency (for example, 58.75 MHz) converted by a tuner are amplified respectively by exclusive amplifying circuits and are detected is different from the intercarrier detecting system wherein a sound signal is detected from a beat component (4.5 MHz) of a video intermediate frequency (58.78 MHz) and sound intermediate frequency (54.25 MHz). In the split carrier detecting system, fundamentally no buzzing sound is generated by the video signal. Therefore, this system is extensively used as a high quality sound detecting system.

In FIG. 7 is shown an essential part of a television receiving apparatus of a conventional split carrier detecting system.

In FIG. 7, an RF television signal input into an antenna 1 is input into an ET tuner 2 in which a desired channel signal is selected from among RF signals. An IF signal from the ET tuner 2 is input into a filter 3 and is here separated into a video IF signal and a sound IF signal. Then, the video IF signal is amplified and video-detected by a video IF circuit 4. The sound IF signal is mixed in a mixing circuit 6 with a local oscillating signal from a second local oscillating circuit 5 and is converted to a second sound IF signal (4.5 to 10.7 MHz) and is amplified and sound-detected with a sound alone in a sound IF circuit 7. The video signal video-detected in the video IF circuit 4 is amplified in the video amplifying circuit 8 and is output. In the apparatus shown here, the power source of the local oscillating circuit of the ET tuner 2, the power source of the video IF circuit 4 and the power source of the video amplifying circuit 8 are obtained from the same power source circuit 9.

The same as in FIG. 6, in FIG. 7, too, in case the power source of the local oscillating circuit of the ET tuner 2, the power source of the video IF circuit 4 and the power source of the video amplifying circuit 8 are driven by the same power source, a slight ripple voltage will be produced in the power source line with the variation of the video signal current, the local oscillating output of the ET tuner 2 will fluctuate because of this ripple voltage, the sound IF signal in the output of the ET tuner 2 will be modulated in the frequency by the video signal and, when it is sound-detected, a video buzzing sound will be generated in the television sound to disadvantage.

Thus, in the television receiving apparatus, the video buzzing sound is generated because the local oscillating output of the local oscillating circuit of the ET tuner 2 has a sensitivity fluctuating under the influence of the ripple voltage of a $\mu V$ order and the video signal turns round as a power source ripple into the ET tuner 2 side through the power source system and, as a result, influences the sound signal.

In order to reduce the above mentioned ripple voltage, briefly the capacity of a decoupling condenser for removing ripples usually connected to a power source line may be made large but, in the general circuit apparatus in which power source lines are connected to various load circuits, the load impedance is so low that the effect of removing ripples for the increase of the condenser capacity is small and the desired characteristics are hard to obtain.

Therefore, the ripple removing filter is strengthened exclusively for the power source for the local oscillating circuit of the ET tuner or another power source circuit 10 is provided besides the power source circuit 9 as connected to the main power source as shown in FIG. 8 and is made a power source for the local oscillating circuit of the ET tuner 2. The power source of the ET tuner 2 is separated from the power sources of the video IF circuit 4 and video amplifying circuit 8, the video signal is prevented from turning round into the ET tuner 2 side through the power source system and the video buzzing sound is prevented from being generated.

However, in the above mentioned method, the power source system is divided into two systems of power sources, an excess filter for removing power source ripples is required and therefore there have been problems that the space on the circuit substrate increases and the cost is high.

SUMMARY OF THE INVENTION

An object of the present invention is to provide a television receiving apparatus wherein the generation of a video buzzing sound can be prevented with a simple circuit formation without requiring to separate the power source system and to use an excess filter for removing power source ripples.

That is to say, in order to attain the above mentioned object, the present invention provides a television receiving apparatus comprising a tuner inputting an RF signal and selecting a predetermined channel signal and converting it to an IF signal; a video IF circuit amplifying and detecting the IF signal coming from this tuner; a video amplifying circuit amplifying the video-detected signal from this video IF circuit; and a power source circuit feeding power sources to the above mentioned tuner, video IF circuit and video amplifying circuit, characterized in that the above mentioned video If circuit output step or the above mentioned video amplifying circuit is formed of at least a pair of amplifying circuits comprising an NPN transistor amplifying circuit and PNP transistor amplifying circuit fed with a video signal of the same polarity and driven by the same power source from the above mentioned power source circuit.

In the present invention, as the NPN transistor amplifying circuit and PNP transistor amplifying circuit are fed with the video signal of the same polarity and are driven by the same power source, even though the polarities of the video output signals from the respective amplifying circuits are the same, the polarities of the load currents flowing to the respective NPN and PNP transistors will be reverse to each other, therefore the ripple currents by both transistors will be cancelled with each other, the ripple voltage by the video signal in the power source line will be eliminated, as a result, the power source ripples to the local oscillating circuit power source of the tuner will reduce and therefore no video buzzing sound will be generated.

DETAILED DESCRIPTION OF THE PREFERRED EMBODIMENTS

Figure 1:
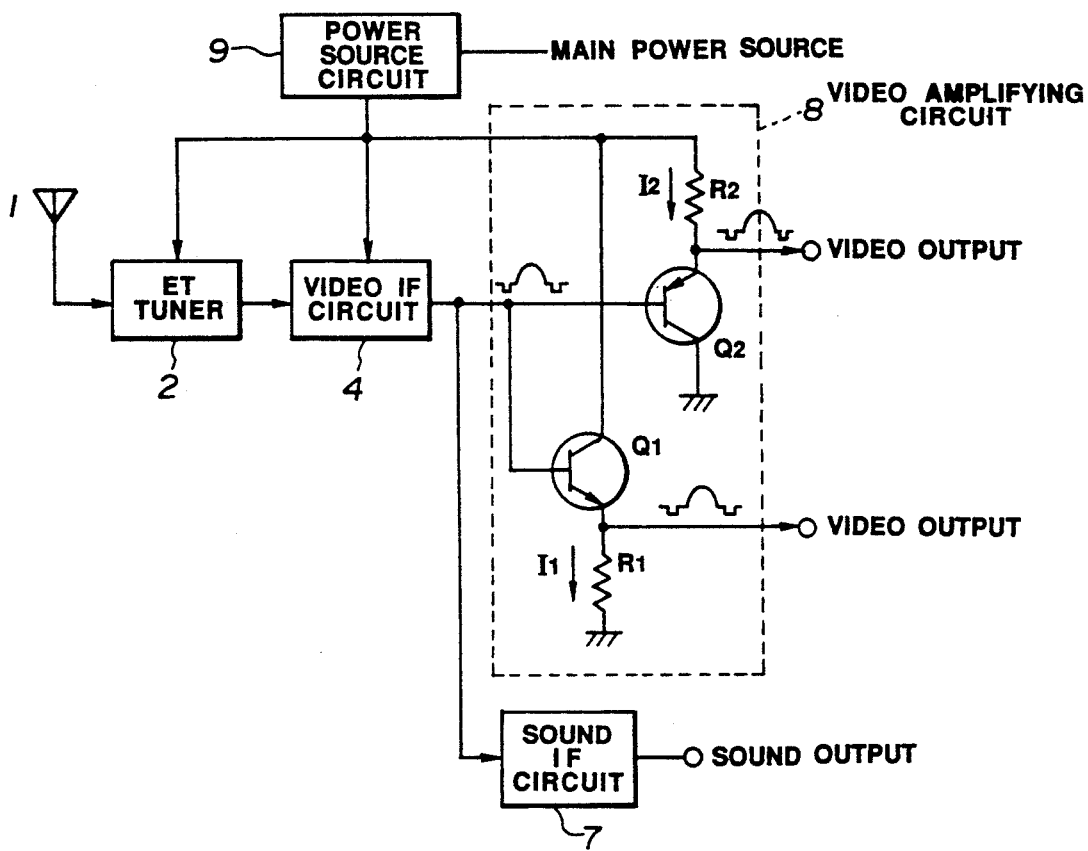
FIG. 1 is a circuit diagram showing an essential part of a television receiving apparatus of an embodiment of the present invention.

FIG. 1 is a circuit diagram showing an essential part of a television receiving apparatus of an embodiment of the present invention.

In the embodiment shown in this drawing, the circuit of this invention is used in a television receiving apparatus of an intercarrier detecting system.

Figure 6:
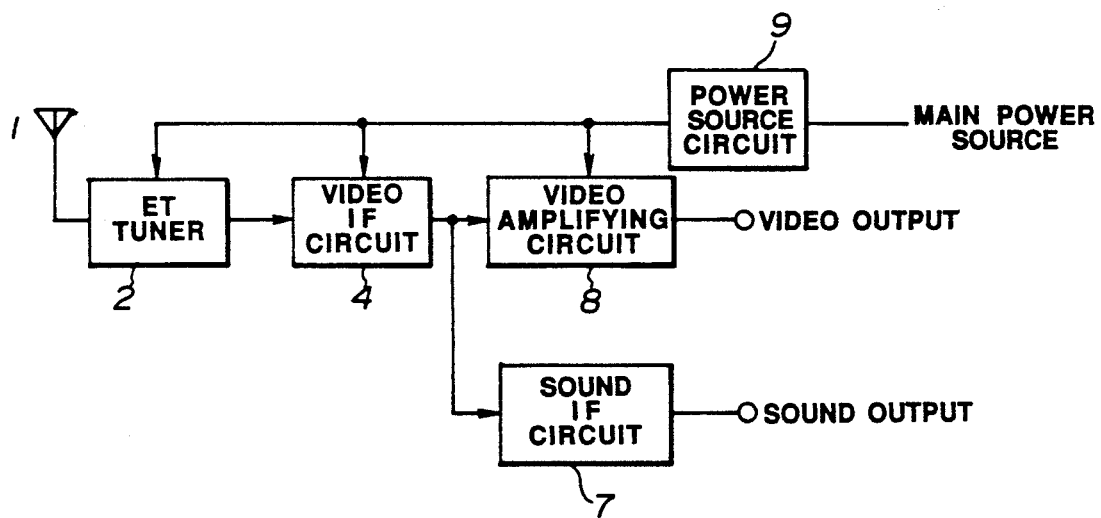
FIG. 6 is a block diagram showing an example of a conventional television receiving apparatus.

In FIG. 1, the explanation shall be made with the same reference numerals attached to the same parts as in FIG. 6. RF television signals input into an antenna 1 are input into an ET tuner 2. A desired channel signal is selected from among the RF signals in this ET tuner 2. The IF signal from the ET tuner 2 is amplified and video-detected in a video IF circuit 4 and the video-detected output is fed to a sound IF circuit 7 and video amplifying circuit 8. A sound intercarrier signal included in the video-detected output is amplified and sound FM-detected in a sound IF circuit 7 and is output. In the apparatus shown here, the power source for the local oscillating circuit of the ET tuner 2, the power source of the video IF circuit 4 and the power source of the video amplifying circuit 8 are obtained from the same power source circuit 9.

The video detected output from the video IF circuit 4 is fed to the video amplifying circuit 8 including a first buffer circuit by an NPN transistor Q1 and a second buffer circuit by a PNP transistor Q2. The first buffer circuit is formed of an emitter follower circuit wherein the above mentioned video-detected output is fed to the base of the NPN transistor Q1, its emitter is connected to a reference potential point through a resistance R1, the collector is connected to the power source circuit 9 and a video output is obtained from the emitter. The second buffer circuit is formed of an emitter follower circuit wherein the above mentioned video-detected output is fed to the base of the PNP transistor Q2, the collector is connected to the reference potential point, the emitter is connected to the power source circuit 9 through a resistance R2 and a video output is obtained from the emitter. By the way, in the drawing, the video amplifying circuit 8 is formed of a pair of an NPN transistor amplifying circuit and PNP transistor amplifying circuit but may be formed of a plurality of sets (pairs) of an NPN transistor amplifying circuit and PNP transistor amplifying circuit. The output of the first buffer circuit by the transistor Q1 or the output of the second buffer circuit by the transistor Q2 is fed to a video signal processing circuit in the later step not illustrated.

The operation in FIG. 1 shall be explained in the following.

When a video signal of a positive polarity is applied to the base of the NPN transistor Q1, if the input impedance of the circuit in the later step is negligible, the load current I1 of the transistor Q1 will be determined by the emitter resistance R1 and the higher the video modulation degree, the larger the current I1. On the other hand, when the same video signal is applied to the base of the PNP transistor Q2, in the same manner, if the input impedance of the signal processing circuit in the later step is negligible, the load current I2 of the transistor Q2 will be determined by the emitter resistance R2 and, contrary to the case of the transistor Q1, the higher the video modulation degree, the smaller the current I2. Therefore, when the load current is considered as divided into a direct current part and alternating current part, the load current I1 is divided into a direct current part I01 and alternating current part i1 and the load current I2 is divided into a direct current part I02 and alternating current part i2, $$I1 = I01 + i1$$

$$I2 = I02 + i2$$

will be made but, as $$|i1| = |i2|,$$

if the resistance values R1 and R2 of the resistances R1 and R2 are set to be R1=R2, as originally the alternating current parts i1 and i2 are reverse to each other in the polarity for the above described reason, as the alternating current parts i1 and i2 are canceled, the power source current Is (=I1+I2) will be represented by $$\begin{aligned} Is &= I1 + I2 \\ &= I01 + I02 + i1 + i2 \\ &= I01 + I02 \end{aligned}$$

and will be only the direct current part. This means that the ripple of the power source current Is by the video signal is zero. Under such condition, even if the power source voltage of the power source circuit 9 is commonly used as a local oscillating circuit power source of the ET tuner 2, no unnecessary modulation by power source ripples will be generated in the local oscillating signal and, as a result, a high quality sound having little video buzzing sound will be obtained.

By the way, in case there are a plurality of pairs of a PNP transistor amplifying circuit and NPN transistor amplifying circuit, the respective total alternating current values of both of the PNP transistor amplifying circuits and NPN transistor amplifying circuits may be made equal to each other.

Figure 2:
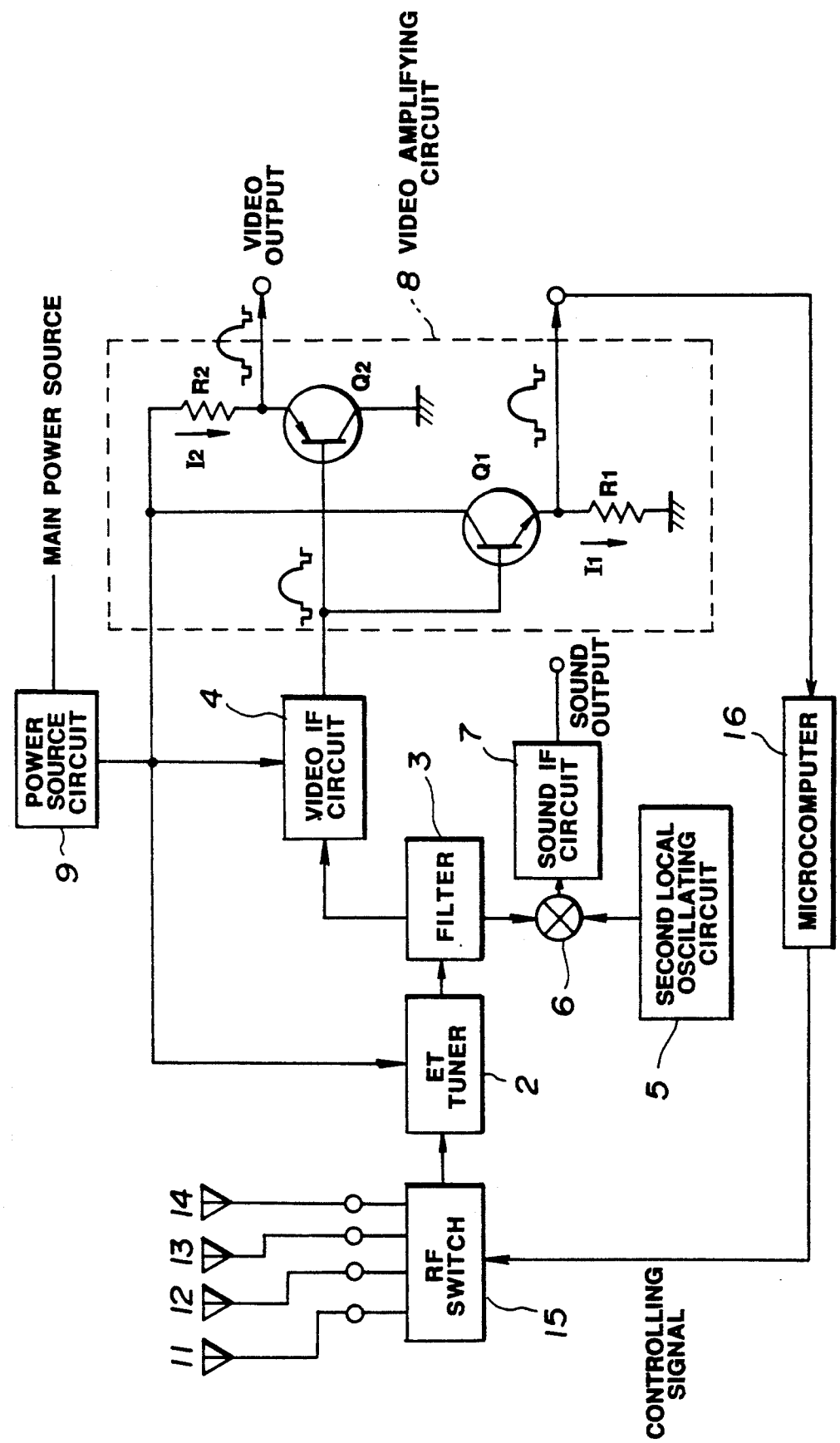
FIG. 2 is a circuit diagram showing an essential part of a television receiving apparatus of another embodiment of the present invention.

FIG. 2 is a circuit diagram showing an essential part of a television receiving apparatus of another embodiment of the present invention.

In the embodiment shown in this drawing, the circuit of this invention is used in a car mounted television receiving apparatus of a split carrier detecting system and antenna diversity receiving system. The antenna diversity receiving system is provided with a plurality of antennae, uses a microcomputer (mentioned as a micom hereinafter) and selectively introduces an RF signal from the antenna largest in the output.

Figure 7:
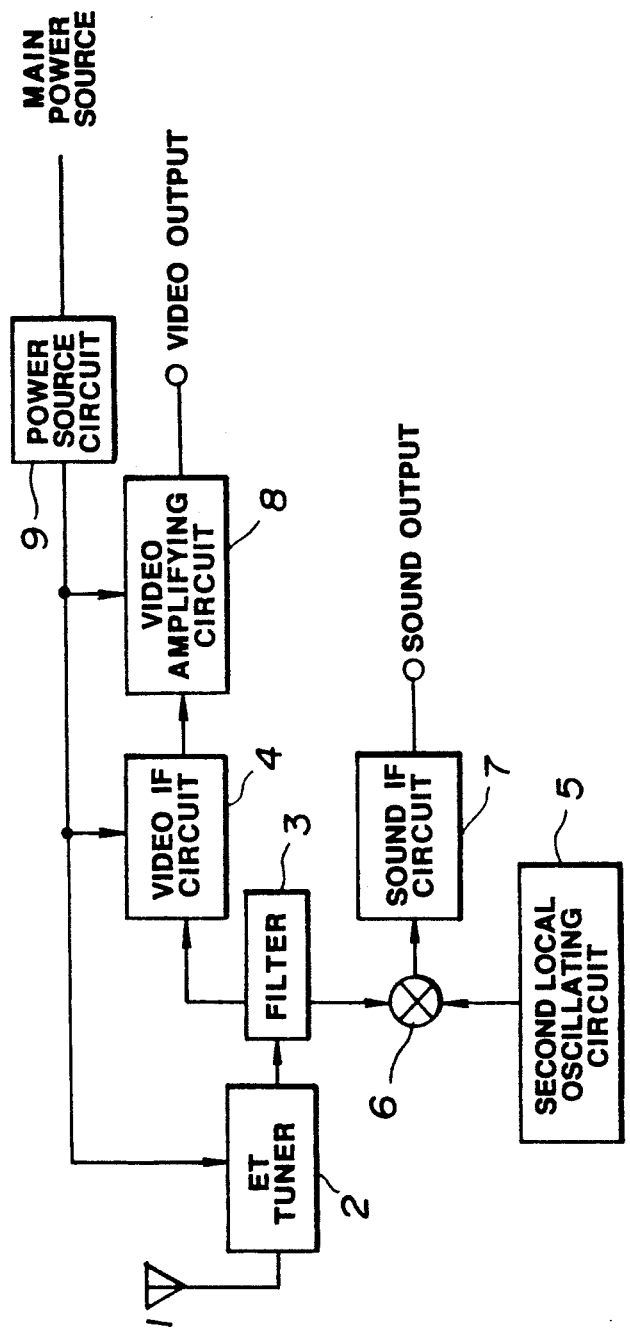
FIG. 7 is a block diagram showing a television receiving apparatus of another conventional example.
Figure 8:
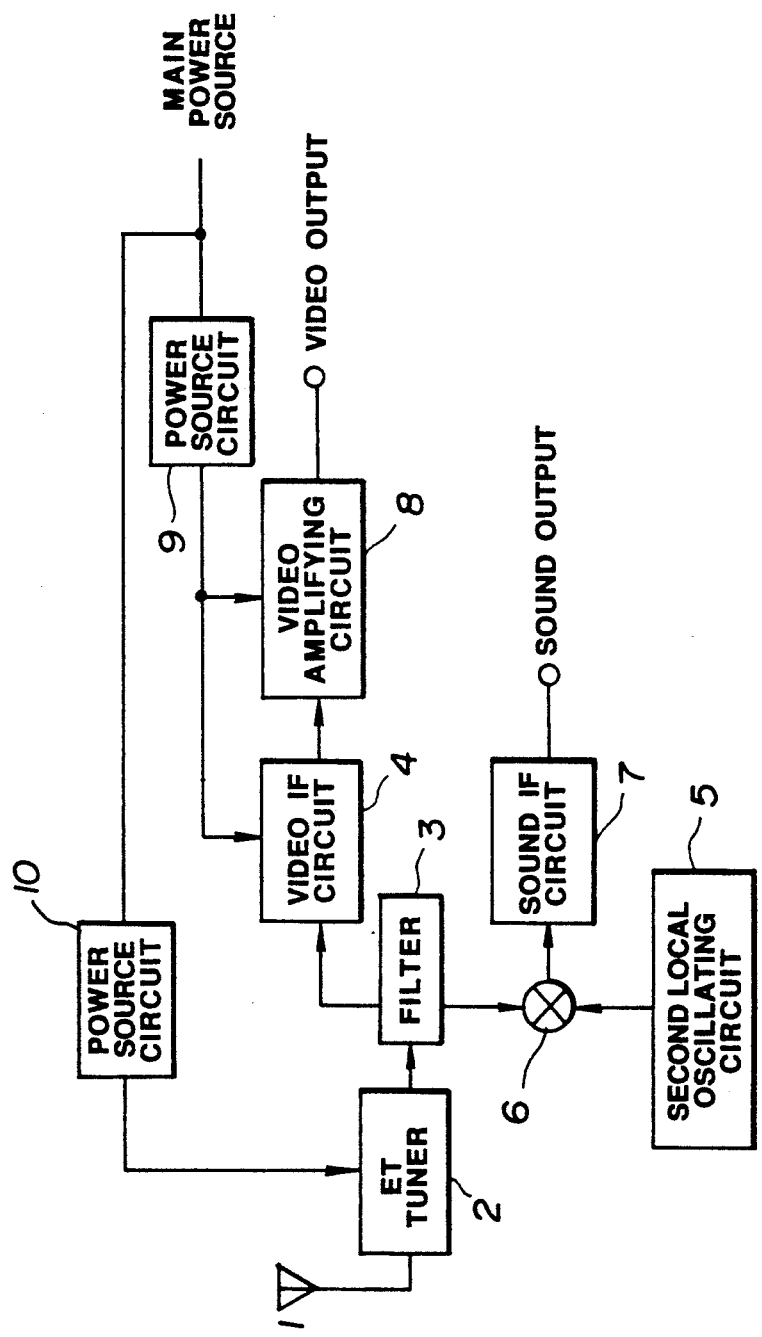
FIG. 8 is a block diagram showing a television receiving apparatus of still another conventional example.

In FIG. 2, the explanation shall be made with the same reference numerals attached to the same parts as in FIG. 7. RF signals induced in antennae 11 to 14 are introduced into an RF switch 15 which selectively introduces the RF signals of the antennae 11 to 14 on the basis of a controlling signal and feeds them to an ET tuner 2. The ET tuner 2 amplifies the introduced RF signals, selects predetermined channel signals, converts them in the frequency and feeds them to a filter 3 which separates the video IF signal and the sound IF signal coming from the ET tuner from each other. The video IF signal is amplified and video-detected in a video IF circuit 4.

The video-detected output from the video IF circuit 4 is fed to a video amplifying circuit 8 including a first buffer circuit by an NPN transistor Q1 and a second buffer circuit by a PNP transistor Q2. The first buffer circuit is formed of an emitter follower circuit wherein the above mentioned video-detected output is fed to the base of the NPN transistor Q1, its emitter is connected to a reference potential point through a resistance R1, the collector is connected to a power source circuit 9 and a video output is obtained from the emitter. The second buffer circuit is formed of an emitter follower circuit wherein the above mentioned video-detected output is fed to the base of the PNP transistor Q2, the collector is connected to the reference potential point, the emitter is connected to the power source circuit 9 through a resistance R2 and a video output is obtained from the emitter. By the way, in the drawing, the video amplifying circuit 8 is formed of a pair of an NPN transistor amplifying circuit and PNP transistor amplifying circuit but may be formed of a plurality of sets (pairs) of an NPN transistor amplifying circuit and PNP transistor amplifying circuit. The output of the first buffer circuit by the transistor Q1 is fed to a micom 16. The output of the second buffer circuit by the transistor Q2 is fed to a video signal processing circuit in the later step not illustrated. The micom 16 will output to the RF switch 15 a controlling signal switching the antennae 11 to 14 at a time of a $\mu$ sec. order in each vertical blanking period within a vertical scanning period to successively select the antennae 11 to 14 and, in a video period, the RF switch 15 will introduce the RF signal from the antenna of the largest video output. By the way, the video output fed to the video signal processing circuit in the later step may be obtained from the second buffer circuit and the video output fed to the micom 16 may be obtained from the first buffer circuit.

The operation of the video amplifying circuit 8 in the apparatus in FIG. 2 is the same as in FIG. 1. If the resistance values R1 and R2 of the resistances R1 and R2 are set to be R1=R2, as the polarities of the alternating current part i1 of the load current I1 and the alternating current part i2 of the load current I2 are reverse to each other, the alternating current parts i1 and i2 will be canceled with each other and, as a result, the power source current Is (=I1+I2) will be only of a direct current part. This means that the ripple of the power source current Is by the video signal will be zero. Under such condition, even if the power source voltage of the power source circuit 9 is commonly used as a power source for the local oscillating circuit of the ET tuner 2, no unnecessary modulation by the power source ripple will be generated in the local oscillating signal and, as a result, a high quality sound intrinsic to the split carrier detecting system and having no video buzzing sound will be obtained.

By the way, it is needless to say that, in case there are a plurality of pairs of a PNP transistor amplifying circuit and NPN transistor amplifying circuit, the respective total alternating current values of both of the PNP transistor amplifying circuits and NPN transistor amplifying circuits may be made equal to each other.

Figure 3:
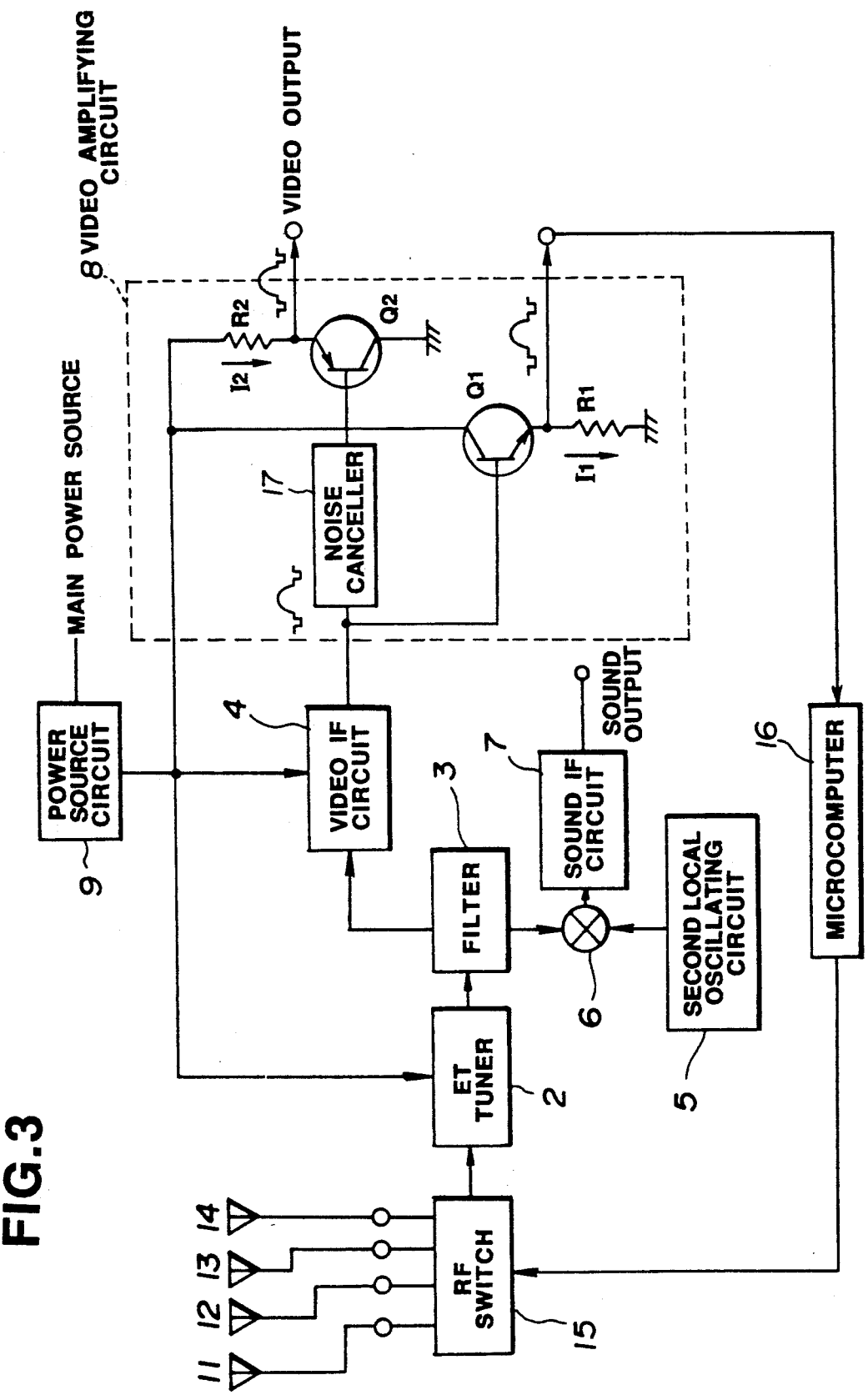
FIG. 3 is a circuit diagram showing a modification of FIG. 2.

FIG. 3 is a circuit diagram showing a modification of FIG. 2.

In the embodiment shown in this diagram, in such television receiving apparatus of a diversity receiving system as in FIG. 2, a noise canceller for removing noises in the video detected output is arranged in the later step of the video IF circuit 4. In FIG. 3, a noise canceller 17 is provided between the first buffer circuit by the NPN transistor Q1 and the second buffer circuit by the PNP transistor Q2.

This is for the following reason. That is to say, the video output from the first buffer circuit by the NPN transistor Q1 is fed to a video signal processing circuit not illustrated and the video output from the second buffer circuit by the PNP transistor Q2 is fed to a micom 16 for controlling the diversity reception. The video signal through the noise canceller 17 is improper as a video signal fed to the micom 16. The micom 16 will output a controlling signal for switching the antennae 11 to 14 at a time of a $\mu$ sec. order in each vertical blanking period in one vertical scanning period (1V), will take in a plurality (4 in the drawing) of video outputs corresponding to the respective antennae 11 to 14 obtained in the vertical blanking period and will control the RF switch 15 to select the antenna of the largest output of these video outputs in the other period than the vertical blanking period. On the other hand, the noise canceller 17 is to remove high frequency noises contained in the video signal. From the video signal through the noise canceller 17, the signal sampled in each short time in the vertical blanking period will be removed and no normal diversity controlling signal will be able to be obtained. Therefore, for the noise canceller 17 arranging position in the later step of the video IF circuit 4, the base path of the transistor Q1 for obtaining the diversity receiving controlling sampling output is improper and it is proper to arrange the noise canceller 17 on the base path of the video amplifying transistor Q2.

Thus, in the television receiving apparatus of the diversity receiving system, when the NPN transistor Q1 and PNP transistor Q2 are arranged in parallel with each other as shown in FIGS. 2 and 3 in the video amplifying circuit 8 and the noise canceller 17 is arranged on the base path of the transistor Q2, a diversity controlling video output from the transistor Q1 to the micom 16 will be able to be obtained and a video output from the Q2 to the video signal processing circuit will be able to be obtained. Further, there can be realized an apparatus wherein a video signal from which noises have been removed can be output to the video signal processing circuit in the later step from the Q2 and the video buzzing sound caused by the power source ripples by the video signal current can be prevented from being generated. By the way, it is possible to make the transistor Q1 used for diversity reception a PNP transistor and make the transistor Q2 for video amplification an NPN transistor.

Figure 4:
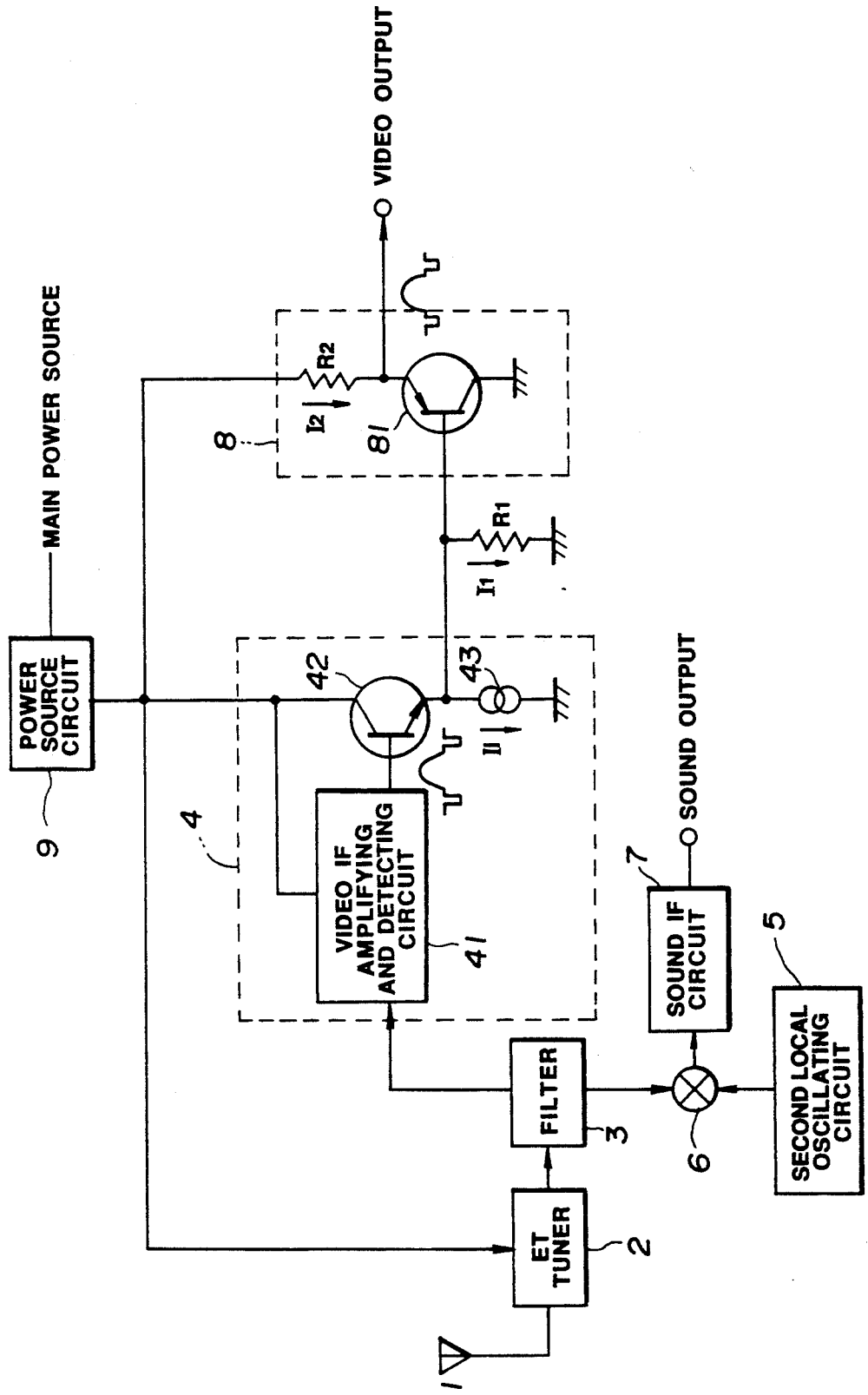
FIG. 4 is a block diagram showing an essential part of still another embodiment of the present invention.

FIG. 4 is a circuit diagram showing an essential part of a television receiving apparatus of still another embodiment of the present invention.

In the embodiment shown in this drawing, an output buffer circuit by an NPN transistor 42 is included in the video IF circuit 4 in the apparatus of FIG. 7 and the video IF circuit 4 is formed of a video IF amplifying and detecting circuit 41 and NPN output buffer transistor 42. The output of the above mentioned video IF amplifying and detecting circuit 41 is fed to the base of the above mentioned NPN output buffer transistor 42, the emitter of the NPN output buffer transistor 42 is connected to the reference potential point through a constant current source 43 and a power source voltage is to be fed to the collector from the power source circuit 9. This power source voltage is fed also to the video IF amplifying and detecting circuit 41, ET tuner 2 and amplifying circuit 8. Between the emitter of the NPN output buffer transistor 42 and the reference potential point, the resistance R1 is connected so as to be in parallel with the above mentioned constant current source 43 and the emitter output of the transistor 42 is fed to the video amplifying circuit 8. The video amplifying circuit 8 inputs the emitter output of the above mentioned NPN transistor 42 into the base of a PNP transistor 81, the collector of the PNP transistor 81 is connected to the reference potential point, the emitter is connected to the power source circuit 9 through a resistance R2 and the video output is taken out of the emitter and is fed to a video signal processing circuit in a later step not illustrated.

In the case of this embodiment, also the same as in the case of FIG. 1, R1=R2 may be set so that the alternating current parts i1 and i2 by the load currents I1 and I2 may be equal to each other. By the way, the current Ii flowing through the video IF circuit 4 is usually a fixed current, is constant and therefore does not contribute to the ripple current.

By the way, in the embodiment of FIG. 4, the buffer circuit by the NPN transistor is used in the front step and the buffer circuit by the PNP transistor is used in the rear step but the buffer circuit by the PNP transistor may be used in the front step and the buffer circuit by the NPN transistor may be used in the rear step.

Figure 5:
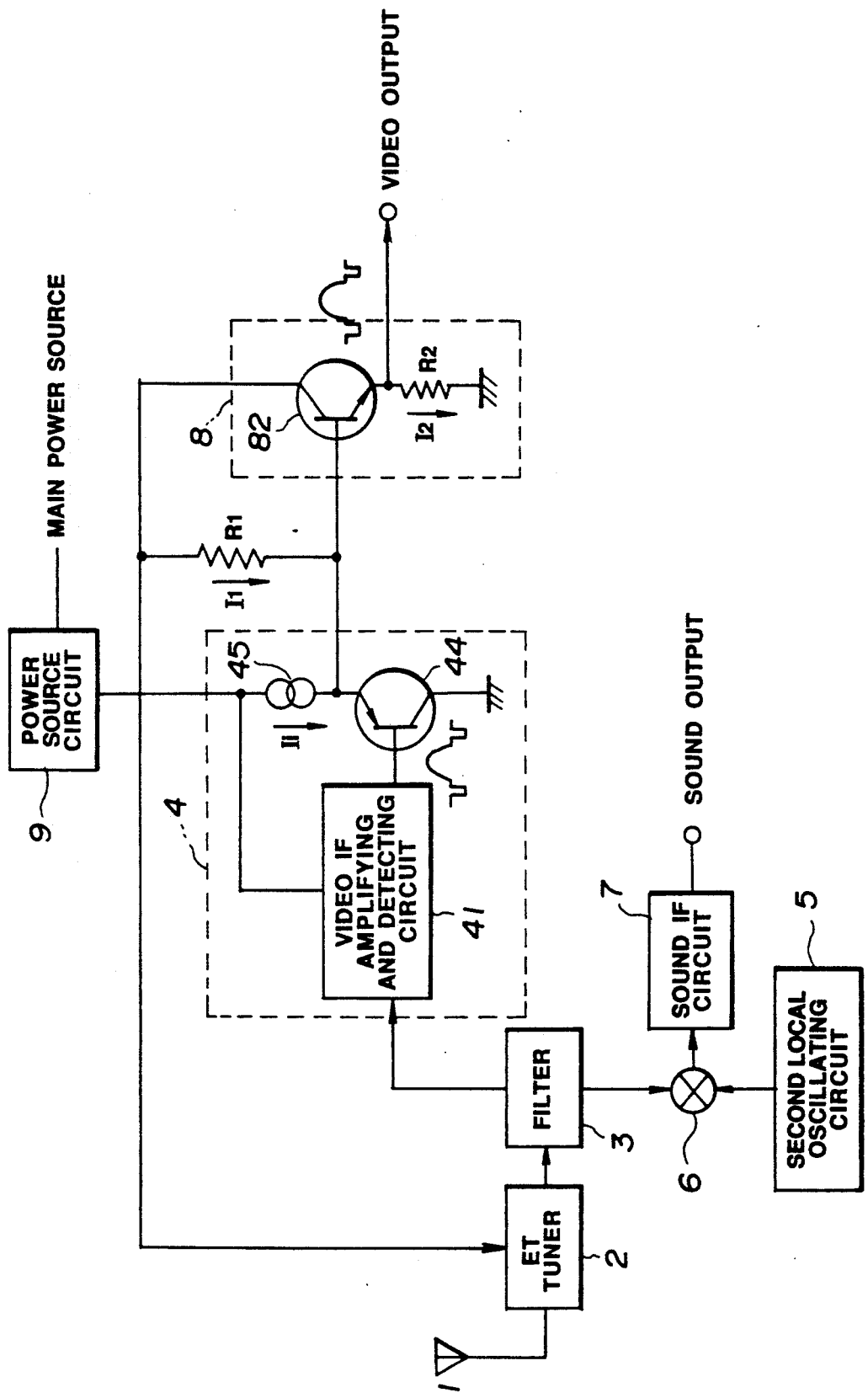
FIG. 5 is a circuit diagram showing a modification of FIG. 4.

In FIG. 5 is shown a modification of FIG. 4.

In the embodiment shown in this drawing, the video IF circuit 4 is formed of a video IF amplifying and detecting circuit 41 and a PNP output buffer transistor 44. The output of the above mentioned video IF amplifying and detecting circuit 41 is fed to the base of the above mentioned PNP output buffer transistor 44, the emitter of a PNP output buffer transistor 44 is connected to the power source circuit 9 through a constant current source 45 and the collector is connected to the reference potential point. The power source voltage of the power source circuit 9 is fed also to the video IF amplifying and detecting circuit 41, ET tuner 2 and amplifying circuit 8. Between the emitter of the PNP output buffer transistor 44 and the reference potential point, the resistance R1 is connected so as to be in parallel with the above mentioned constant current source 45 and the emitter output of the transistor 44 is fed to the video amplifying circuit 8. The video amplifying circuit 8 inputs the emitter output of the above mentioned PNP transistor 44 into the base of the NTN transistor 82, the collector of the NPN transistor 82 is connected to the power source circuit 9, its emitter is connected to the reference potential point through a resistance R2 and a video output is taken out of the emitter and is fed to a video signal processing circuit in a later step not illustrated.

In the case of this embodiment, too, the same as in the case of FIG. 4, R1=R2 may be set so that the alternating current parts i1 and i2 by the load currents I1 and I2 may be equal to each other. Even in this case, the electric current Ii flowing through the video IF circuit 4 will be usually a fixed current, will be constant and therefore will not contribute to the ripple current.

By the way, the circuit of the present invention may be used as arranged in the rear step of the video IF circuit, that is, in the rear step of the detecting circuit, because, in the step of the IF signal of the front step of the detecting circuit, the IF signal is of an AM-modulated waveform (a waveform made by AM-modulating a carrier wave of an intermediate frequency with a video signal) vertically symmetrical with a predetermined direct current level as a center and therefore the ripples produced in the power source line by the video signal will be of positive and negative reverse phases, will be cancelled with each other and will have no influence on the power source line. On the other hand, in the rear step of the detecting circuit, the video-detected video signal has one vertical period (for example, of 60 Hz) and therefore this component of 60 Hz is in the audible frequency range and will have a bad influence as a buzzing sound on the sound output when mixed as a ripple in the power source line. (However, the horizontal frequency (of 15.734 KHz) is outside the audible frequency range and will have no bad influence on the sound.) Therefore, the circuit of the present invention may be arranged in the rear step of the detecting circuit.

As described above, according to the present invention, as an output step of a video IF circuit or a video amplifying circuit, an NPN transistor amplifying circuit and PNP transistor amplifying circuit are used in a pair and are set so that the video signal currents flowing through both transistors may be equal to each other, therefore the ripple voltage produced in the power source line can be eliminated. The video buzzing sound caused by the influence of the video signal can be eliminated and a high quality sound can be obtained without any special circuit addition and cost rise. Particularly, when the present invention is used for a television receiving apparatus of a split carrier detecting system, a high quality sound intrinsic to the split carrier detecting system will be able to be obtained to advantage.

By the way, the present invention is not limited to only the above mentioned embodiments but various modifications can be made in a range not deviating from the scope of the invention.

What is claimed is:

1. A television receiving apparatus characterized by comprising:
   a tuner inputting an RF signal, selecting a predetermined channel signal and converting it to an IF signal;
   a circuit means comprising a video IF circuit amplifying and detecting the IF signal from this tuner and a video amplifying circuit amplifying the video-detected signal from this video IF circuit and forming said video IF circuit output step or said video amplifying circuit of at least a pair of amplifying circuits comprising an NPN transistor amplifying circuit and PNP transistor amplifying circuit fed with a video signal of the same polarity and driven by the same power source; and
   a power source circuit feeding power sources to said tuner, said video IF circuit and said video amplifying circuit.

2. A television receiving apparatus characterized by comprising:
   a tuner inputting an RF signal, selecting a predetermined channel signal and converting it to an IF signal;
   a means for separating the IF signal coming from this tuner into a video IF signal and a sound IF signal;
   a circuit means comprising a video IF circuit amplifying and detecting the separated video IF signal and a video amplifying circuit amplifying the video-detected signal from this video IF circuit and forming said video IF circuit output step or said video amplifying circuit of at least a pair of amplifying circuits comprising an NPN transistor amplifying circuit and PNP transistor amplifying circuit fed with a video signal of the same polarity and driven by the same power source from said power source circuit; and
   a power source circuit feeding power sources to said tuner, said video IF circuit and said video amplifying circuit.

3. A television receiving apparatus according to claim 1 or 2 characterized in that said pair of amplifying circuits are formed of:
   a first emitter follower circuit using an NPN transistor wherein the video-detected output from said video IF circuit is input into the base, the collector is connected to said power source circuit, the emitter is connected to the reference potential point through a first resistance and the output is obtained from the emitter; and
   a second emitter follower circuit using a PNP transistor wherein the video-detected output from said video IF circuit is input into the base, the collector is connected to the reference potential point, the emitter is connected to said power source circuit through a second resistance of the same resistance value as of said first resistance and the output is obtained from the emitter.

4. A television receiving apparatus according to claim 1 or 2 characterized in that said pair of amplifying circuits are formed of a cascade-connected circuit using an emitter follower circuit using an NPN transistor and an emitter follower circuit using a PNP transistor and making either one emitter follower circuit a front step and the other emitter follower circuit a rear step so that the video-detected output may be input into the base of one emitter follower circuit and the output may be obtained from the emitter of the other emitter follower circuit.

5. A television receiving apparatus characterized by comprising:
   a plurality of antennae;
   an RF switch selectively introducing on the basis of a controlling signal RF signals induced in the plurality of antennae;
   a tuner inputting the RF signals from this Rf switch, selecting a predetermined channel signal and converting it to an IF signal;
   a means for separating the IF signal coming from this tuner into a video IF signal and a sound IF signal;
   a video IF circuit amplifying and detecting the separated video IF signal;
   a power source circuit feeding a power source to said tuner and said video IF circuit;
   a video amplifying circuit formed of:
   a first emitter follower circuit using an NPN transistor wherein the video-detected output from said video IF circuit is input into the base, the collector is connected to said power source circuit, the emitter is connected to the reference potential point through a first resistance and the output is obtained from the emitter or the collector and
   a second emitter follower circuit using a PNP transistor wherein the video-detected output from said video IF circuit is input into the base, the collector is connected to the reference potential point, the emitter is connected to said power source circuit through a second resistance of the same resistance value as of said first resistance and the output is obtained from the emitter or the collector; and a controlling means for controlling said RF switch so that a video output of either one emitter follower circuit of said first emitter follower circuit and second emitter follower circuit may be input and, in a predetermined period of the video signal, a controlling signal will be output to said RF switch, said plurality of antennae will be successively selected and the RF signal from the antenna largest in the video output will be selectively introduced.

* * * * *

UNITED STATES PATENT AND TRADEMARK OFFICE
CERTIFICATE OF CORRECTION

PATENT NO. : 5,233,424
DATED : 8/3/93
INVENTOR(S) : NUIMURA, Yoshimi

It is certified that error appears in the above-indentified patent and that said Letters Patent is hereby corrected as shown below:

```
Column 3, line 32 reads: "If circuit"
         should read:   --IF circuit--

Column 5, lines 51, 56 and 58 read:   "antennae"
         should read:   --antennas--

Column 6, lines 26 and 29 read:   "antennae"
         should read:   --antennas--

Column 7, lines 11, 12 and 15 read: "antennae"
         should read:   --antennas--

Column 10, lines 40, 43 read:   "antennae"
          should read:   --antennas--

Column 10, line 44 reads:   "Rf switch"
          should read:   --RF switch--

Column 12, line 2, "antennae" should read--antennas--
```

Signed and Sealed this

Twenty-sixth Day of April, 1994

Attest:

BRUCE LEHMAN

*Attesting Officer*    *Commissioner of Patents and Trademarks*